(12) United States Patent
Henry

(10) Patent No.: US 9,133,001 B2
(45) Date of Patent: Sep. 15, 2015

(54) PALLET POSITIONING BAR

(75) Inventor: Charles E. Henry, St. helena Island, SC (US)

(73) Assignee: HENRY IMPLEMENTS, LLC, Jacksonville, FL (US)

( * ) Notice: Subject to any disclaimer, the term of this patent is extended or adjusted under 35 U.S.C. 154(b) by 762 days.

(21) Appl. No.: 13/417,545

(22) Filed: Mar. 12, 2012

(65) Prior Publication Data

US 2012/0171009 A1 Jul. 5, 2012

Related U.S. Application Data

(62) Division of application No. 12/925,574, filed on Oct. 25, 2010, now abandoned.

(51) Int. Cl.
*B66F 9/12* (2006.01)
*B66F 9/19* (2006.01)

(52) U.S. Cl.
CPC . *B66F 9/12* (2013.01); *B66F 9/195* (2013.01); *B62B 2203/29* (2013.01); *Y10S 414/125* (2013.01)

(58) Field of Classification Search
CPC ....... B62B 2203/29; B66F 9/195; B66F 9/12; Y10S 414/125
USPC .......................... 414/607, 785, 912; 187/237
See application file for complete search history.

(56) References Cited

U.S. PATENT DOCUMENTS

| | | |
|---|---|---|
| 3,071,268 A | 1/1963 | Wales |
| 4,890,973 A | 1/1990 | Frison et al. |
| 6,192,807 B1 | 2/2001 | Mason |
| 6,206,628 B1 | 3/2001 | McDermott |
| 6,408,768 B1 | 6/2002 | Giampavolo et al. |
| 6,408,770 B1 | 6/2002 | Mason |
| 6,547,508 B2 | 4/2003 | Perry |

*Primary Examiner* — Scott Lowe
(74) *Attorney, Agent, or Firm* — Thomas C. Saitta

(57) ABSTRACT

A method of utilizing a pallet positioning bar to reposition a loaded pallet, the pallet positioning bar having a main body with a face member, a pair of fork members and a lifting flange connected to the face member at or near the top, wherein the fork members are adapted to be manually inserted into the loaded pallet with the main body flush against one side of the pallet, such that the fork tips of a forklift or handtruck can be abutted against the face member beneath the lifting flange, then lifted to raise and tilt the pallet positioning bar and the loaded pallet, enabling the loaded pallet to be repositioned by pushing against the face member.

12 Claims, 3 Drawing Sheets

PALLET POSITIONING BAR

This application is a divisional application and claims the benefits of U.S. patent application Ser. No. 12/925,574, filed Oct. 25, 2010, hereby incorporated by reference.

BACKGROUND OF THE INVENTION

This invention relates generally to the field of pallets and more particularly to accessories for pallets, and even more particularly to accessories that are utilized in association with movement or repositioning of the pallets by forklift trucks or similar devices, for protection of the pallets and/or facilitation of movement, when the pallet is on the ground or support surface.

It is well known to utilize pallets to enable efficient movement of multiple, heavy or odd-shaped objects, wherein a motorized forklift or handtruck is used to raise the pallet off the ground, the forklifts or handtrucks being wheeled devices. The forklifts or handtrucks possess a pair of forks that extend in parallel for insertion into or beneath a pallet, the forks able to be raised and lowered by motor or hydraulic means. The pallets may be composed of wood, plastic, metal or similar material capable of supporting a load. The pallets typically comprise a deck to directly support the load, the deck being a planar sheet member, a plurality of slat members, or a custom shaped surface to correspond with the particular load or object being supported. The deck is positioned a short distance from the ground surface through the use of legs, side walls, stringers or like members. At least one side of the pallet is provided with a single large fork access opening or a pair of smaller openings to receive the forks of the forklift or handtruck, which are inserted horizontally and extend sufficient distance beneath the deck to allow the pallet to be raised and lowered securely and without excessive tilting. In this manner a loaded pallet may be moved in well known manner from one position to another by inserting the forks into the pallet, relocating the pallet, and then lowering the pallet at the desired location.

In many instances it is desirable to place the pallet into a relatively confined or specific location, such as when the pallet it being loaded onto a trailer or positioned in a warehouse amidst other pallet, next to a wall, etc. It is often difficult for even skilled operators to accurately position the forklift or handtruck so that when the pallet is lowered it is in the precise location desired. When loading pallets from the ground onto trailers from the rear, the desired final location may be beyond the reach of the forklift. Furthermore, in some instances the forks themselves will extend beyond pallets of small dimension, making it impossible to lower the pallet such that it is abutting another pallet, a wall or like structure. In these circumstances, the forklift or handtruck operator will attempt to reposition the pallet by pushing against the side wall of the pallet with the ends of the forks, or by inserting the forks a small distance into the pallet, raising one side of the pallet slightly to reduce the area of the pallet in contact with the ground surface, then advancing the forklift to slide the pallet into the desired location. With both of these techniques, multiple tries may be required to obtain the desired position. Additionally, these techniques can easily damage the pallets or the load supported by the pallet if great care is not taken.

It is an object of this invention to address the problems set forth above with regard to repositioning a pallet situated on the ground or support surface into a precise location by providing a device that allows the forklift or handtruck operator to quickly and easily reposition the pallet while minimizing or eliminating the potential of damaging either the pallet or the load. It is a further object to provide such a device that is readily portable and is structured to be universally applicable to all pallet types.

SUMMARY OF THE INVENTION

The invention is a portable pallet positioning bar that enables the operator of a forklift, handtruck or similar device to easily reposition a loaded pallet into a precise location. The pallet positioning bar comprises an elongated main body having a face member, at least one lifting flange member oriented substantially perpendicularly to the face member and extending rearward, and a pair of fork members extending from the front of the face bar, the fork members capable of insertion into the fork openings found on standard pallets. The lifting flange member may be a single elongated member or a plurality of shorter members. A footer flange member may be provided on the base of the main body, thereby altering the generally L-shaped cross-sectional configuration of the main body to a generally C-shaped configuration in cross-section. A handle for lifting and carrying the device may also be provided. The fork members may each comprise an upper surface member adapted to abut and support the underside of a pallet deck and a runner member having a curved or slanted end to facilitate insertion of the fork members into the pallet and sliding along the ground surface.

To utilize the pallet positioning bar, the fork members are manually inserted into the fork openings of the pallet to be repositioned, such that the elongated main body abuts the exposed side of the pallet. The forklift or handtruck operator then inserts the tips of the forks of the forklift or handtruck beneath the lifting flange member and abutting the face member of the pallet positioning bar. The forks of the forklift or handtruck are raised slightly to elevate the pallet positioning bar and tilt the near side of the pallet to reduce surface friction, and the forklift or handtruck is then advanced to reposition the pallet, the forks of the forklift or handtruck pushing against the face member of the pallet positioning bar to slide the pallet. When the pallet is properly repositioned, the forks are lowered and removed from the pallet positioning bar, and the pallet positioning bar is manually removed for subsequent use with other pallets.

DETAILED DESCRIPTION OF THE INVENTION

Figure 1:
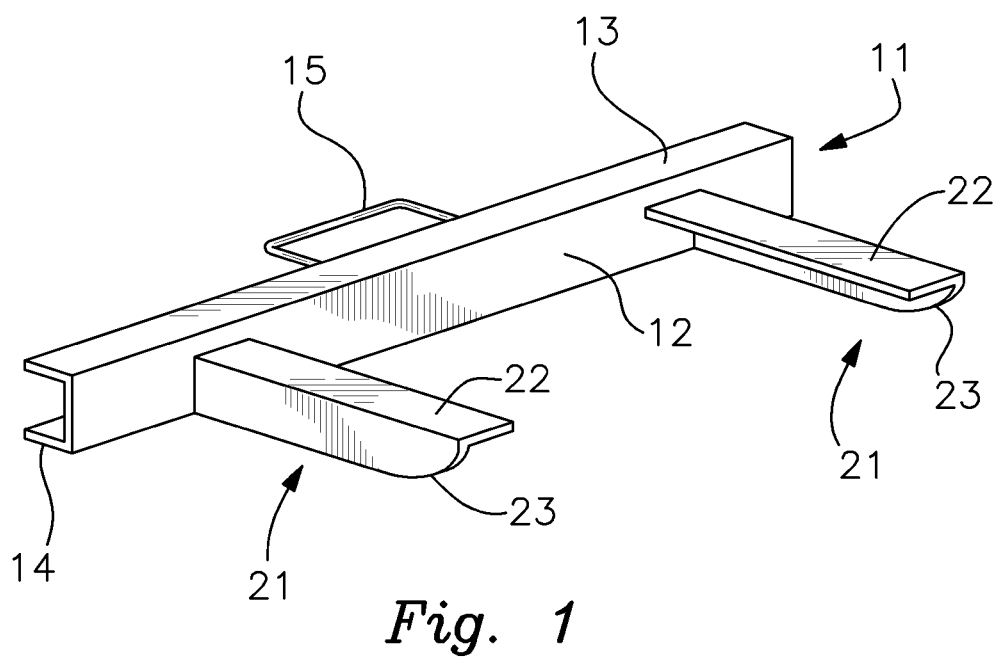
FIG. 1 a perspective view of an embodiment of the invention.
Figure 2:
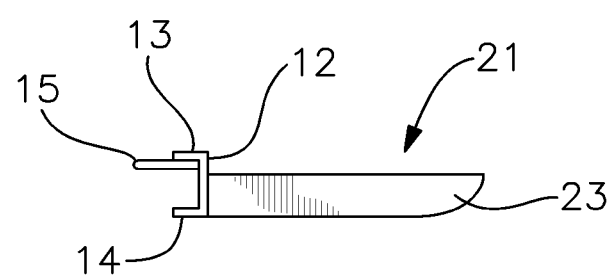
FIG. 2 is a side view of the embodiment of FIG. 1.
Figure 3:
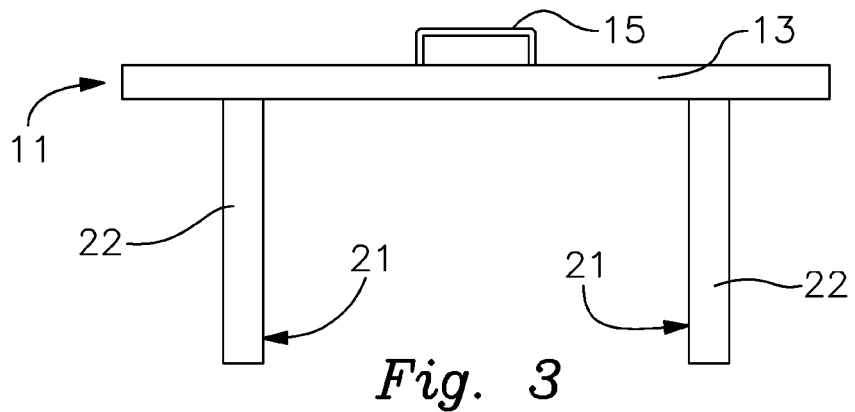
FIG. 3 is a top view of the embodiment of FIG. 1.
Figure 4:
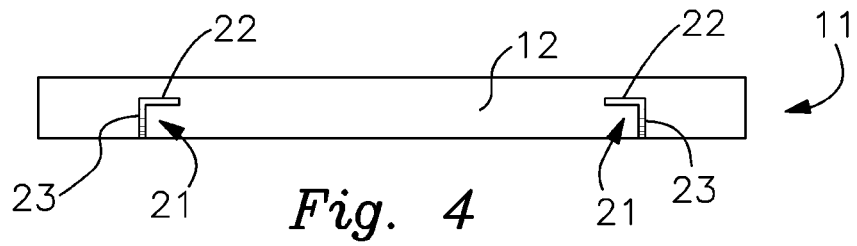
FIG. 4 is a front view of the embodiment of FIG. 1.
Figure 5:
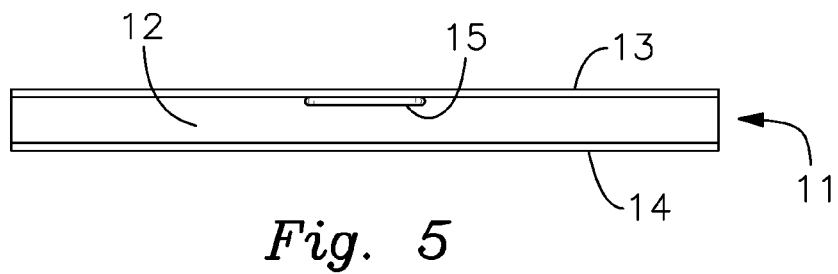
FIG. 5 is a rear view of the embodiment of FIG. 1.
Figure 6:
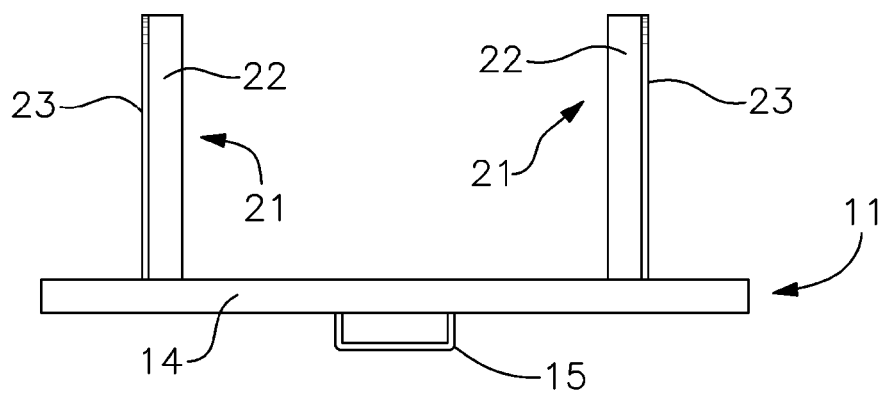
FIG. 6 is a bottom view of the embodiment of FIG. 1.

With reference to the drawings, which depict one embodiment of the pallet positioning bar invention, the invention will now be described in detail with regard for the best mode and preferred embodiment. In a most general sense, the pallet positioning bar comprises an elongated main body having a face member, at least one lifting flange member oriented substantially perpendicularly to the face member and extending rearward, and a pair of fork members extending from the front of the face bar, the fork members capable of insertion into the fork openings found on standard pallets.

The pallet positioning bar comprises an elongated main body 11 which extends generally horizontally or parallel to the ground surface when in use. The main body 11 comprises an elongated face member 12, a lifting flange member 13 and a pair of fork members 21. The face member 12 presents an abutment surface that is disposed generally vertically relative to the ground surface when first inserted into the pallet. The lifting flange member 13 extends rearward from the face member 12 and presents an abutment surface that is disposed generally perpendicularly to the abutment surface of the face member 12 and generally horizontally or parallel to the ground surface when first inserted into the pallet. The pair of fork members 21 extend forward from the opposite side of the face member 12 and are disposed generally horizontally or parallel to the ground surface during use. The pallet positioning bar is preferably constructed of a hard and durable metal material and is structured and designed to be relatively rigid and sufficiently strong to raise a loaded pallet without excessive deformation.

The fork members 21 are laterally spaced a sufficient distance apart and are of a length such that a loaded pallet will not excessively tilt to either side when the pallet is raised using the pallet positioning bar. A separation distance of approximately 25-33 inches has been found to be suitable, i.e., a separation distance generally equivalent to the standard separation distance utilized in the industry for forklifts and handtrucks, but the separation distance may also be greater or smaller without departing from the functionality of the device. Preferably the fork members 21 are shorter than the forks found on a typical forklift or handtruck, and a length of approximately 12 to 18 inches has been found to be suitable, but the length may also be greater or smaller without departing from the functionality of the device. As shown in the drawings, the fork members 21 may be formed from angle iron so as to comprise an upper surface member 22 and a runner member 23, such that they possess a generally L-shaped transverse cross-sectional configuration. Alternatively, the forks could be formed from materials having rectangular, elliptical or circular cross-sections, and may be solid or hollow. The underside of the tips or free ends of the fork members 21 are preferably curved, rounded or slanted, such that initial insertion into the pallet is more readily accomplished and so that the tips will more easily slide along the ground surface when the pallet is being repositioned. In the embodiment shown in the drawings, upper surface member 22 presents a contact surface to abut the underside of the pallet deck and runner members 23 are curved on the ends and provide the ground contacting surface.

The fork members 21 extend in the forward direction from face member 12, which is constructed to present a substantially planar abutment surface on its rear side. The face member 12 is composed of a material possessing sufficient strength and rigidity to allow a loaded pallet to be moved when the face member 12 is pushed by the fork tips of a forklift or handtruck.

At or near the top of the face member 12, the lifting flange member 13 extends rearward, i.e., to the opposite side relative to the fork members 21. The lifting flange member 13 is likewise composed of a material possessing sufficient strength and rigidity to allow a loaded pallet to be tilted when the fork tips of a forklift or handtruck abutting the face member 12 are raised. The lifting flange member 13 presents a substantially planar underside or lower contact surface abutted by the upper side of the forks of the forklift or handtruck when the forks are raised. The lifting flange member 13 is disposed relative to the face member 12 such that with the device in position on the ground and fork members 21 inserted into a pallet, the underside of the lifting flange member 13 is a sufficient distance above the ground surface such that the fork tips of the forklift or handtruck may easily be inserted beneath the lifting flange member 13. In practice it has been found that a distance of approximately 3 inches from the bottom of the face member 12 is suitable. The lifting flange member 13 may be a single elongated member or may comprise a plurality of shorter segments positioned appropriately to contact the forks of the forklift or handtruck. Preferably, lifting flange member 13 extends outwardly a relatively short distance, such as for example approximately 1-2 inches. With this construction, should the operator of the forklift or handtruck raise the forks too high such that the stability of the load may be endangered, the pallet positioning bar and pallet will slip from the fork tips. Thus, the construction provides an automatic safeguard against excessive tilting by the operator.

In a more preferred embodiment, the main body 11 further comprises a footer flange member 14 extending rearward at or near the bottom of the face member 12, i.e., in the same direction as the lifting flange member 13. With this construction, the main body 11 possesses a generally C-shaped transverse cross-sectional configuration, and the main body 11 can be manufactured from channel bar material. Footer flange member 14 provides additional stability for the device when in use. As with the lifting flange member 13, the footer flange member 14 may be a single elongated member or may comprise a plurality of shorter segments.

A handle member 15 may also be connected to said main body 11 to make manual insertion, removal and transport of the device easier.

Figure 7:
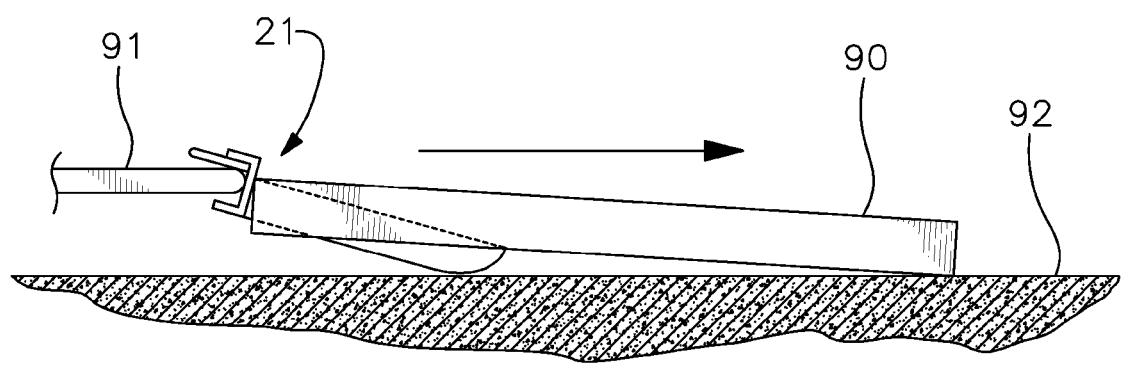
FIG. 7 is a view showing the embodiment of FIG. 1 in use during repositioning of a pallet.

The pallet positioning bar is utilized in the following manner, as shown in FIG. 7. After a loaded pallet 90 has been set onto the ground surface 92 and the forklift or handtruck forks have been removed, the fork members 21 of the pallet positioning bar are inserted into the fork openings of the pallet 90 and the main body 11 is pushed against the side of the pallet 90. The forklift or handtruck operator then advances the fork tips 91 against the face member 12 and beneath the lifting flange member 13. The operator then raises the forks slightly, thereby lifting the pallet positioning bar and slightly tilting the pallet 90, such that frictional resistance between the pallet 90 and the ground surface 92 is reduced and movement of the pallet 90 is more easily accomplished. The operator then repositions the pallet 90 by pushing against the face member 12, either straight on or at an angle if the pallet 90 needs to be turned slightly. With the pallet 90 in the correct location, the forks are lowered, the forklift or handtruck is backed out, and the pallet positioning bar is removed. In certain circumstances where frictional resistance between the pallet 90 and the ground surface 92 is not significant, it may be sufficient to push against the face member 12 without raising the forks to tilt the pallet 90.

It is understood that equivalents and substitutions for certain elements described above may be obvious to those of ordinary skill in the art, and the embodiments set forth above in the drawings and description are not meant to be limiting, such that the true scope and definition of the invention is to be as set forth in the following claims.

I claim:

1. A method of repositioning a pallet resting on a ground surface comprising the steps of:
   providing a pallet positioning bar comprising an elongated main body, said main body comprising a face member; a pair of fork members extending from said main body, said fork members having curved or slanted ends; and a lifting flange member connected to said main body at or near the top of said face member, said lifting flange member extending on the opposite side of said face member from said fork members;

manually inserting said fork members of said pallet positioning bar into said pallet;

providing a forklift or handtruck having fork tips;

advancing the fork tips against said face member of said elongated main body and beneath said lifting flange member;

raising said fork tips a short distance such that said pallet is tilted and said pallet positioning bar is tilted with said curved or slanted ends of said fork members remaining in contact with said ground surface;

sliding said pallet and said curved or slanted ends of said fork members along said ground surface until the desired repositioning location is reached;

lowering said fork tips such that said pallet rests on said ground surface;

backing said fork tips away from said face member; and manually removing said pallet positioning bar from said pallet.

2. The method of claim 1, wherein said step of providing a pallet positioning bar comprises providing such pallet positioning bar wherein said fork members have a length between approximately 12 and 18 inches and said lifting flange member extends no greater than approximately 2 inches, and wherein said step of manually inserting comprise inserting said fork members a distance of between approximately 12 and 18 inches.

3. The method of claim 1, wherein said step of providing a pallet positioning bar comprises providing such pallet positioning bar further comprising a footer flange member connected to said main body at or near the bottom of said face member, said footer flange member extending on the same side of said face member as said lifting flange member, and wherein said step of advancing the fork tips further comprises advancing the fork tips above said footer flange.

4. The method of claim 1, wherein said step of providing a pallet positioning bar comprises providing such pallet positioning bar further comprising a handle member connected to said main body, and wherein said steps of manually inserting and manually removing comprise grasping said handle member.

5. A method of repositioning a pallet resting on a ground surface comprising the steps of:

providing a portable pallet positioning bar comprising an elongated main body, said main body comprising a face member; a pair of fork members extending from said main body, said fork members having curved or slanted ends; and a lifting flange member connected to said main body at or near the top of said face member, said lifting flange member extending on the opposite side of said face member from said fork members; said pallet positioning bar being of a size and weight whereby said pallet positioning bar may be carried and positioned by an individual;

manually inserting said fork members of said pallet positioning bar into said pallet;

providing a forklift or handtruck having fork tips;

advancing the fork tips against said face member of said elongated main body and beneath said lifting flange member;

raising said fork tips a short distance such that said pallet is tilted and said pallet positioning bar is tilted with said curved or slanted ends of said fork members remaining in contact with said ground surface;

sliding said pallet and said curved or slanted ends of said fork members along said ground surface until the desired repositioning location is reached;

lowering said fork tips such that said pallet rests on said ground surface;

backing said fork tips away from said face member; and manually removing said pallet positioning bar from said pallet.

6. The method of claim 5, wherein said step of providing a pallet positioning bar comprises providing such pallet positioning bar wherein said fork members have a length between approximately 12 and 18 inches and said lifting flange member extends no greater than approximately 2 inches, and wherein said step of manually inserting comprise inserting said fork members a distance of between approximately 12 and 18 inches.

7. The method of claim 5, wherein said step of providing a pallet positioning bar comprises providing such pallet positioning bar further comprising a footer flange member connected to said main body at or near the bottom of said face member, said footer flange member extending on the same side of said face member as said lifting flange member, and wherein said step of advancing the fork tips further comprises advancing the fork tips above said footer flange.

8. The method of claim 5, wherein said step of providing a pallet positioning bar comprises providing such pallet positioning bar further comprising a handle member connected to said main body, and wherein said steps of manually inserting and manually removing comprise grasping said handle member.

9. A method of repositioning a pallet resting on a ground surface comprising the steps of:

providing a portable pallet positioning bar comprising an elongated main body, said main body comprising a face member; a pair of fork members extending from said main body, said fork members having curved or slanted ends; and a lifting flange member connected to said main body at or near the top of said face member, said lifting flange member extending on the opposite side of said face member from said fork members; said pallet positioning bar being of a size and weight whereby said pallet positioning bar may be carried and positioned by an individual without the aid of additional equipment;

manually inserting said fork members of said pallet positioning bar into said pallet without the aid of additional equipment;

providing a forklift or handtruck having fork tips;

advancing the fork tips against said face member of said elongated main body and beneath said lifting flange member;

raising said fork tips a short distance such that said pallet is tilted and said pallet positioning bar is tilted with said curved or slanted ends of said fork members remaining in contact with said ground surface;

sliding said pallet and said curved or slanted ends of said fork members along said ground surface until the desired repositioning location is reached;

lowering said fork tips such that said pallet rests on said ground surface;

backing said fork tips away from said face member; and manually removing said pallet positioning bar from said pallet without the aid of additional equipment.

10. The method of claim 9, wherein said step of providing a pallet positioning bar comprises providing such pallet positioning bar wherein said fork members have a length between approximately 12 and 18 inches and said lifting flange member extends no greater than approximately 2 inches, and wherein said step of manually inserting comprise inserting said fork members a distance of between approximately 12 and 18 inches.

11. The method of claim 9, wherein said step of providing a pallet positioning bar comprises providing such pallet positioning bar further comprising a footer flange member connected to said main body at or near the bottom of said face member, said footer flange member extending on the same side of said face member as said lifting flange member, and wherein said step of advancing the fork tips further comprises advancing the fork tips above said footer flange.

12. The method of claim 9, wherein said step of providing a pallet positioning bar comprises providing such pallet positioning bar further comprising a handle member connected to said main body, and wherein said steps of manually inserting and manually removing comprise grasping said handle member.

\* \* \* \* \*